United States Patent [19]

Bunger

[11] 4,257,281
[45] Mar. 24, 1981

[54] ENGINE STARTER AND ACCESSORY DRIVE APPARATUS

[75] Inventor: Dennen J. Bunger, Clinton, N.Y.

[73] Assignee: The Bendix Corporation, Teterboro, N.J.

[21] Appl. No.: 51,603

[22] Filed: Jun. 25, 1979

[51] Int. Cl.³ .............................................. F02N 15/02
[52] U.S. Cl. .......................................... 74/6; 74/336 R; 74/745; 123/179 D; 192/42
[58] Field of Search ............ 123/179 D; 74/6, 336 R, 74/745, 665 Q; 192/42

[56] References Cited
U.S. PATENT DOCUMENTS 1,158,597  11/1915  Wadsworth .................... 123/179 D
2,887,100  5/1959  Papst ............................... 123/179 D
2,904,027  9/1959  Zubaty ........................... 74/665 Q X
3,974,719  8/1976  Tiliander ............................. 76/6 X Primary Examiner—Allan D. Herrmann
Attorney, Agent, or Firm—Anthony F. Cuoco; William F. Thornton

[57] ABSTRACT

Apparatus is disclosed wherein a starter provides power for starting an engine and the starter gearing and an overrunning clutch are arranged so that the engine drives an accessory coupled to the starter by using particular elements of the starter gearing while other elements of the gearing come to rest, thereby eliminating separate drive means between the starter and accessory.

6 Claims, 1 Drawing Figure

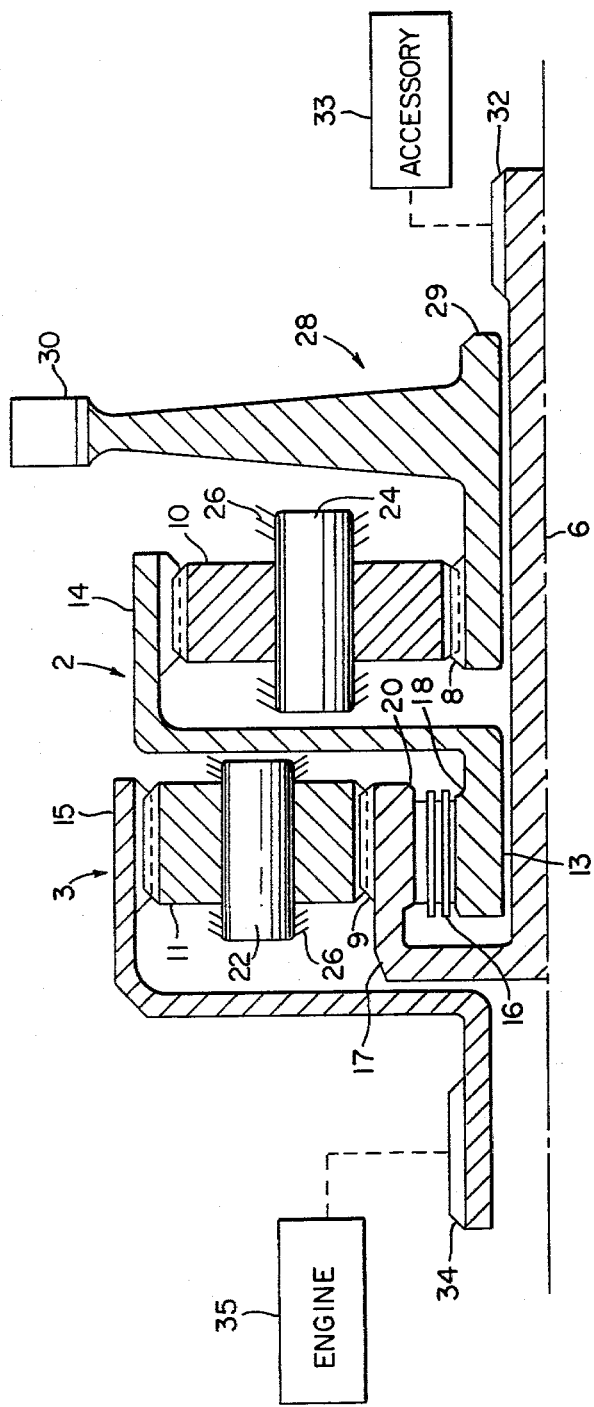

4,257,281

ENGINE STARTER AND ACCESSORY DRIVE APPARATUS

FIELD OF THE INVENTION

This invention relates generally to starters and particularly to starters arranged to start an engine and having coupled thereto an accessory driven by the engine when the engine reaches its operating speed.

DESCRIPTION OF THE PRIOR ART

Engines are started by rotational power provided by starters. It is common practice to arrange the engine to drive accessories such as generators or the like coupled to the starter, upon the engine reaching its operating speed. Prior to the present invention separate means such as a gear system disposed between the starter and the accessory had to be used for the purposes intended. This resulted in the obvious disadvantages of a more complex and larger system than desirable, as for aircraft applications or the like. The present invention utilizes particular elements of the starter gearing to drive the accessory and hence obviates the aforenoted disadvantages.

SUMMARY OF THE INVENTION

This invention contemplates engine starter and accessory drive apparatus including first and second stage gear systems. A one-way drive, overrunning clutch is disposed between the output gear of the first stage and the input gear of the second stage. The arrangement is such that when power is developed at the input gear of the first stage the clutch drives the input gear of the second stage which causes an output drive member coupled to the engine to start the engine. When the engine reaches its operating speed the power input to the first stage decays. However, the engine continues to drive the output drive member and the second gear stage which in turn drives an accessory shaft. Hence, the second gear stage of the starter is active in starting the engine and driving the accessory shaft.

DESCRIPTION OF THE DRAWINGS

The single FIGURE in the drawing is a half-section schematic showing the significant elements of the invention. The Drawing does not show conventional elements such as bearings, seals and the like which are typically employed in arrangements of the type described and which are well known to those skilled in the art.

DESCRIPTION OF THE INVENTION

The device herein disclosed includes a first stage planetary gear system designated generally by the numeral 2 and a second stage planetary gear system designated generally by the numeral 3.

Each of the planetary gear systems 2 and 3 include pinion gears 8 and 9, respectively; planetary gears 10 and 11, respectively; and ring gears 14 and 15, respectively.

Between first stage ring gear 14 and second stage input pinion 9 is interposed a one-way drive, overrunning clutch 16. Clutch 16 is suitably mounted between inner and outer races 18 and 20, respectively. Inner race 18 is integral with an axially extending arm member 13 of ring gear 14, while outer race 20 is integral with an axially extending arm member 17 of an accessory shaft 6. Second stage input gear 9 is integral with outer race 20. Studs 22 and 24 are suitably mounted to a housing or the like 26 and rotatably support planetary gears 10 and 11, respectively, by bearings or the like (not shown).

A starter which may be used with the arrangement herein disclosed may be of the air turbine type designated generally by the numeral 28 and including a turbine wheel 29 having a plurality of blades 30, one of which is shown in the drawing. In operation, air flows through blades 30 developing driving power at pinion 8 of first stage planetary gear system 2. Pinion 8 drives planetary gear 10 which meshes with ring gear 14 and provides a reduction in speed and an increase in torque, relative to that of turbine wheel 29 of air turbine starter 28, at inner race 18 of clutch 16.

In this situation, clutch 16 is in contact with inner race 18 and outer race 20, thereby driving pinion gear 9 of second stage planetary gear system 3 and accessory shaft 6. In this connection it is noted that accessory shaft 6 may be coupled through a coupling means 32, which may be a gear arrangement or the like, to an accessory 33 such as a generator which is driven by an engine 35 as will be hereinafter described.

Second stage planetary gear 11 is caused to rotate by pinion gear 9 and, in turn, meshes with ring gear 15 causing an engine output drive coupling 34, which may likewise be a gear arrangement or the like, coupled to engine 35 to drive the engine.

When engine 35 reaches its operating speed and the aforenoted starting cycle terminates, air to turbine 28 is cut off and turbine wheel 29 begins to decelerate to rest. As this occurs, the power input to first stage planetary gear system 2 decays with the deceleration of the turbine. However, the engine, at its operating speed, drives second stage planetary gear system 3 through coupling 34 and planetary gear 11 which, in turn, drives second stage pinion gear 9. In this mode, overrunning clutch 16 rotates with outer race 20 and disengages inner race 18, thereby disconnecting planetary gear systems 2 and 3. The gear systems are not reconnected until the entire system is at rest, i.e., the engine is shut down.

As a result of the engine driving through the second stage planetary gear system as aforenoted, the speed of accessory shaft 6 is increased by the ratio of the second stage gearing. This ratio is selected to provide the desired speed increase at accessory output coupling 32 relative to engine drive coupling 34 driven by the engine. The gear ratio of first stage planetary system 2 is selected in combination with that of second stage planetary gear system 3 to provide the desired ratio between the speed of turbine wheel 29 and engine drive coupling 34.

It will now be seen that the second stage gearing of the starter is active during engine starting as well as during accessory driving, which occurs after the engine is at operating speed. This is a distinct improvement over prior art systems wherein, for example, an additional gear system was typically employed between the starter and the accessory driven by shaft 6, as will be understood by those skilled in the art.

The invention thus features imposing an overrunning clutch between the first stage gearing to the starter and the second stage gearing to the starter, utilizing the second stage gearing to achieve the desired speed increase between the accessory and the engine input drives.

What is claimed is:

1. Engine starter and accessory drive apparatus, comprising:

a first gear system having a predetermined gear ratio;

a second gear system having a predetermined gear ratio;

clutch means coupling the first and second gear systems;

starting means for driving the first gear system, with the clutch means responding to the driven first gear system for driving the second gear system to start the engine;

engine driving means coupled to the second gear system and driven thereby for starting the engine when the second gear system is driven, and driven by the engine for driving the second gear system after the engine has been started, with the clutch means being thereupon effective for uncoupling the first and second gear systems;

accessory driving means coupled to the second gear system and driven thereby to drive the accessory; and the predetermined gear ratios of the first and second gear systems being related so that the engine driving means is driven by the engine and the accessory driving means is driven by the second gear system at different speeds.

2. Apparatus as described by claim 1, wherein:

the first gear system includes output gear means;

the second gear system includes input gear means; and the clutch means coupling the first and second gear systems is disposed between the output gear means of the first gear system and the input gear means of the second gear system.

3. Apparatus as described by claim 2, wherein:

the first gear system includes input gear means in engagement with the output gear means of said system;

the starting means for driving the first gear system drives the input gear means of the first gear system which in turn drives the output gear means of said system; and the clutch means responds to the driven output gear means of the first gear system to drive the input gear means of the second gear system.

4. Apparatus as described by claim 3, wherein:

the second gear system includes output gear means in engagement with the input gear means of said system so as to be driven thereby; and the engine driving means is coupled to the output gear means of the second gear system and driven thereby for starting the engine when the output gear means is driven, and driven by the engine for driving the output gear means after the engine has been started.

5. Apparatus as described by claim 3, wherein:

the output gear means of the second gear system and driven by the engine after the engine has been started is in engagement with the input gear means of the second gear system for driving said input gear means; and the accessory driving member is coupled to the input gear means of the second gear system and driven therewith for driving the accessory.

6. Apparatus as described by claim 1, wherein:

the predetermined gear ratios of the first and second gear systems are related so that the accessory driving means is driven at an increased speed relative to that of the engine driving means.

* * * * *